United States Patent
Sakai (10) Patent No.: US 9,135,531 B2
(45) Date of Patent: Sep. 15, 2015

(54) IMAGE FORMING APPARATUS AND COMPUTER READABLE MEDIUM THEREFOR

(75) Inventor: Katsunori Sakai, Aichi (JP)

(73) Assignee: BROTHER KOGYO KABUSHIKI KAISHA, Nagoya, Aichi (JP)

( * ) Notice: Subject to any disclaimer, the term of this patent is extended or adjusted under 35 U.S.C. 154(b) by 143 days.

(21) Appl. No.: 13/338,691

(22) Filed: Dec. 28, 2011

(65) Prior Publication Data

US 2012/0162694 A1    Jun. 28, 2012

(30) Foreign Application Priority Data

Dec. 28, 2010   (JP) ................................ 2010-294043

(51) Int. Cl.
*G06K 15/02*    (2006.01)
*G06K 15/10*    (2006.01)
*G06K 15/00*    (2006.01)

(52) U.S. Cl.
CPC .......... *G06K 15/102* (2013.01); *G06K 15/1894* (2013.01); *G06K 15/408* (2013.01)

(58) Field of Classification Search
CPC .................................................. G06K 15/1894
USPC ........................... 358/1.14, 1.16, 1.9; 400/74
See application file for complete search history.

(56) References Cited

U.S. PATENT DOCUMENTS

| | | | |
|---|---|---|---|
| 3,426,323 A * | 2/1969 | Shimabukuro | 714/748 |
| 6,033,137 A * | 3/2000 | Ito | 400/74 |
| 7,488,128 B2 | 2/2009 | Aruga et al. | |
| 2005/0280843 A1 | 12/2005 | Aruga et al. | |
| 2008/0180470 A1 | 7/2008 | Oku | |
| 2009/0231602 A1 | 9/2009 | Oku | |
| 2010/0079775 A1 * | 4/2010 | Matoba | 358/1.9 |
| 2010/0238507 A1 * | 9/2010 | Matsushima et al. | 358/1.16 |
| 2012/0038958 A1 * | 2/2012 | Iguchi et al. | 358/505 |

FOREIGN PATENT DOCUMENTS

| | | |
|---|---|---|
| JP | 7-212600 A | 8/1995 |
| JP | 8-309974 A | 11/1996 |
| JP | 9-220806 A | 8/1997 |
| JP | 10-065757 A | 3/1998 |
| JP | 10-093659 A | 4/1998 |
| JP | 2002-248751 A | 9/2002 |

(Continued)

*Primary Examiner* — Chuong A Ngo
*Assistant Examiner* — Bharatkumar Shah
(74) *Attorney, Agent, or Firm* — Scully, Scott, Murphy & Presser P.C.

(57) ABSTRACT

An image forming apparatus is provided. The image forming apparatus includes a conveyer system, a liquid discharge head with a plurality of nozzles arranged in rows in different positions from one another with reference to a conveying direction at least within a part, a transmitter unit to transmit the image-forming data to the liquid discharge head, a receiver unit to receive the image-forming data, an image-forming data storage unit to store the image-forming data, an error detecting unit to detect a transmission error in the image-forming data, and a controller unit to manipulate the transmitter unit, the liquid discharge head, and the conveying system. The image-forming data with the transmission error detected therein for forming dots in pixel areas in liquid discharged from the nozzles, which are arranged in one of the rows closer to an upstream position with reference to the conveying direction, is transmitted preferentially.

8 Claims, 10 Drawing Sheets

(56) References Cited

FOREIGN PATENT DOCUMENTS

| JP | 2006-35852 A | 2/2006 |
| JP | 2006-159551 A | 6/2006 |
| JP | 2007-38577 A | 2/2007 |
| JP | 2008-183884 A | 8/2008 |
| JP | 2009-196282 A | 9/2009 |
| JP | 2009-220353 | 10/2009 |

* cited by examiner

IMAGE FORMING APPARATUS AND COMPUTER READABLE MEDIUM THEREFOR

CROSS REFERENCE TO RELATED APPLICATION

This application claims priority from Japanese Patent Applications No. 2010-294043, filed on Dec. 28, 2010, the entire subject matter of which is incorporated herein by reference.

BACKGROUND

1. Technical Field

An aspect of the present invention relates to an image forming apparatus, specifically to an image forming apparatus, which is capable of discharging liquid to form an image on a recording medium according to print data.

2. Related Art

An image forming apparatus to form an image on a recording medium (e.g., a sheet of paper) in colored liquid (e.g., ink) by driving a liquid discharge head (e.g., an inkjet head) according to print data is known. The print data may be created in the image forming apparatus based on image data, and the image data representing the image to be formed may be inputted in the image forming apparatus from an external device. Therefore, the image forming apparatus may have a data-creating function module to create the print data and a data transmitter means in the data-function function module. Further, the image forming apparatus may have a function module to control the liquid squiring head and a data receiver means in the head-controlling function module. The print data created in the data-creating function module is divided into a plurality of line data, each of which represents a line composing the image, and transmitted from the transmitter to the receiver in the head-controlling function module on basis of the line data. Thus, the liquid discharge head is driven to discharge the liquid onto specific pixel areas in the sheet at specific timings according to the transmitted print data. In so doing, the image as represented by the image data is formed on the sheet. In this regard, a printable area in the sheet are partitioned along a direction of conveying the sheet and along a direction orthogonal to the sheet conveying direction and defined as pixel areas.

When the print data received in the head-controlling function module contains errors and/or data loss, the liquid may not be discharged properly in corresponding pixel areas as intended in the image data, and the formed image based on the deficient print data may appear incomplete. In other words, image-forming quality of the image forming apparatus may be degraded. Meanwhile, a method to detect errors and data loss caused in data transmission is known. According to the method, when an error or data loss is detected in data received in a receiver unit, the receiver unit may request a transmitter unit to retry transmission of the same data.

The method may be applied to the image forming apparatus in order to detect data transmission errors in print data received in the receiver unit in the head-controlling function module, and when an error is detected, the receiver unit may request the transmitter unit to retry transmission of the same print data. In this configuration, it is expected that deterioration of the image forming quality may be prevented.

SUMMARY

When the data transmission method is applied to the print data transmission in the above-mentioned image forming apparatus, it is assumed that data transmission, error detection, and retry transmission are conducted serially on the line data basis. That is, when an error is detected in a piece of line data having been received, retry transmission of the same line data needs to be completed before next data transmission for a next piece of line data starts. Therefore, when the transmission error is detected, a substantial length of interval for the retry transmission is required in between preceding and subsequent line data transmissions. When the interval is longer, a speed for printing the image is lowered eventually.

In view of the above difficulties, the present invention is advantageous in that an image forming apparatus, in which a time period between print data transmission and completion of image forming can be shortened and the image can be formed in shorter time, is provided.

According to an aspect of the present invention, an image forming apparatus to form an image on a recording medium is provided. The image forming apparatus comprises a conveyer system configured to convey the recording medium in a conveying direction, a liquid discharge head which has a plurality of nozzles configured to discharge the liquid onto a plurality of pixel areas to form dots according to image-forming data, the plurality of pixel areas being defined on the recording medium to coincide with resolutions of the image to be formed along the conveying direction and a direction orthogonal to the conveying direction, the plurality of nozzles being arranged in rows, which are spaced apart from one another and laid out in parallel with the orthogonal direction, in different positions from one another with reference to the conveying direction at least within a part, a transmitter unit configured to transmit the image-forming data for forming the dots in the plurality of pixel areas arranged in same coordinate positions on the recording medium with reference to the conveying direction to the liquid discharge head, a receiver unit provided in the liquid discharge head and configured to receive the image-forming data from the transmitter unit, an image-forming data storage unit configured to store the image-forming data received by the receiver unit, an error detecting unit configured to detect a transmission error in the image-forming data received by the receiver unit, and a controller configured to manipulate the transmitter unit to transmit the image-forming data piece by piece to the receiver unit within a transmission cycle from start of transmission of a piece of image-forming data until start of a next piece of image-forming data, the transmission cycle including a predetermined period, in which at least a piece of image-forming data with a transmission error detected therein by the error detecting unit can be transmitted to the receiver unit, and to manipulate the transmitter unit to transmit the image-forming data with the transmission error detected therein for forming the dots in the pixel areas in the liquid discharged from the nozzles, which are arranged in one of the rows closer to an upstream position with reference to the conveying direction amongst the plurality of nozzles, preferentially to the receiver unit in the predetermined period. The controller unit manipulates the liquid discharge head and the conveying system to form the image in dots on the recording medium according to the image-forming data stored in the image-forming data storage unit and the image-forming data received by the receiver unit within the predetermined period.

According to another aspect of the present invention, a non-transitory computer readable medium to store computer readable instructions is provided. The computer readable instructions cause an image forming apparatus, which comprises a conveyer system to convey the recording medium in a conveying direction, a liquid discharge head with a plurality of nozzles arranged in rows extending along a direction orthogonal to the conveying direction, and a controller, to form an image on a recording medium by executing steps of transmitting image-forming data for forming dots in a plurality of pixel areas arranged in same coordinate positions on the recording medium with reference to the conveying direction to the liquid discharge head piece by piece within a transmission cycle, which is from start of transmission of a piece of image-forming data until start of a next piece of image-forming data, the transmission cycle including a predetermined period, in which at least a piece of image-forming data with a transmission error having been detected therein can be transmitted, receiving the transmitted image-forming data in the liquid discharge head, storing the received image-forming data in a storage device, examining the received image-forming data to detect a transmission error, transmitting, in the predetermined period, the image-forming data with the transmission error having been detected therein for forming the dots in the pixel areas in the liquid discharge from nozzles in one of the rows closer to an upstream position with reference to the conveying direction amongst the plurality of nozzles, preferentially to the liquid discharge head, and manipulating the liquid discharge head and the conveying system to form the image in dots on the recording medium according to the image-forming data stored in the image-forming data storage unit and the image-forming data received by the receiver unit within the predetermined period.

DETAILED DESCRIPTION

Hereinafter, embodiments of the present invention will be described with reference to the accompanying drawings. In the following description, identical or similar components throughout the embodiments and drawings are referred to by same reference sings. Further, in a latter embodiment, description of the similar components having been mentioned in a previous embodiment will be omitted.

First Embodiment

Figure 1:
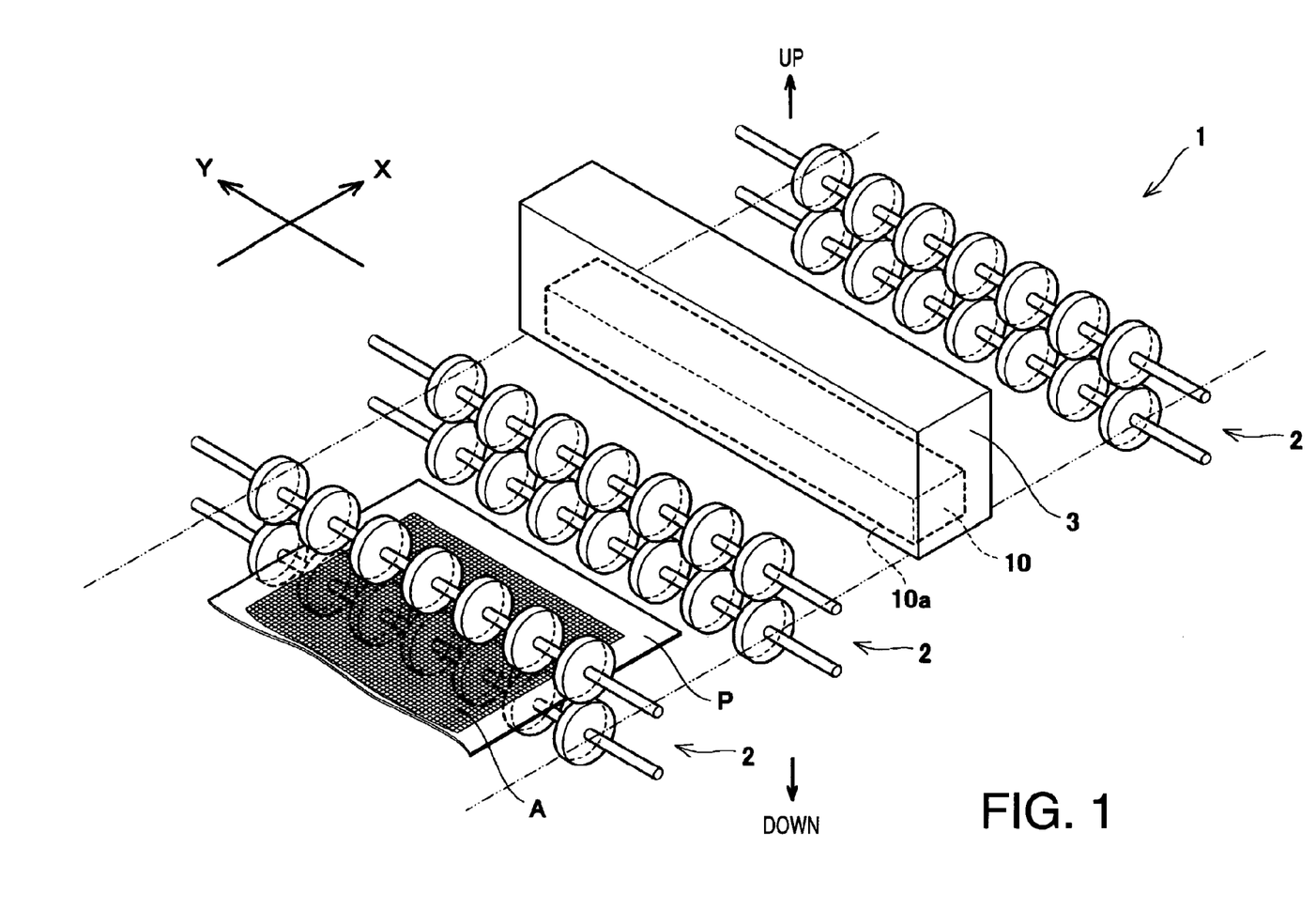
FIG. 1 is a perspective partial view of components in an inkjet printer according to a first embodiment of the present invention.

An inkjet printer 1 (see FIG. 1) being an image forming apparatus according to the present embodiment includes a conveyer system 2 and an inkjet head 3. The conveyer system 2 includes a plurality of pairs of rollers and a motor (not shown) to rotate the rollers. As the rollers in a roller pair rotate, a sheet P being a recording medium is conveyed in a sheet path between the rollers along a horizontal conveying direction X. The sheet P is conveyed in the sheet path with its lengthwise edge aligned in parallel with the conveying direction X and its widthwise edge shifting in parallel with an orthogonal direction Y. The orthogonal direction Y is a direction horizontal and orthogonal to the conveying direction X. Further, in the sheet path, the sheet P is conveyed with its recordable surface facing upward. On the recordable surface of the sheet P, a plurality of pixel areas A are defined in a grid along the directions X and Y to coincide with resolutions of an image to be formed.

The inkjet head 3 includes a head 10, which is arranged to lie along the orthogonal direction Y. In the inkjet printer 1 being a line printer, at least when the sheet P is conveyed in the sheet path by the conveyer system 2, a width of the inkjet head 3 along the orthogonal direction Y is greater than a width of the sheet P. The head 10 has a nozzle surface 10a, in which a plurality of ink-discharging nozzles 20 (see FIG. 2) are formed. The nozzle surface 10a is arranged in a horizontal posture to downwardly face the sheet P being conveyed in the direction of X.

Figure 2:
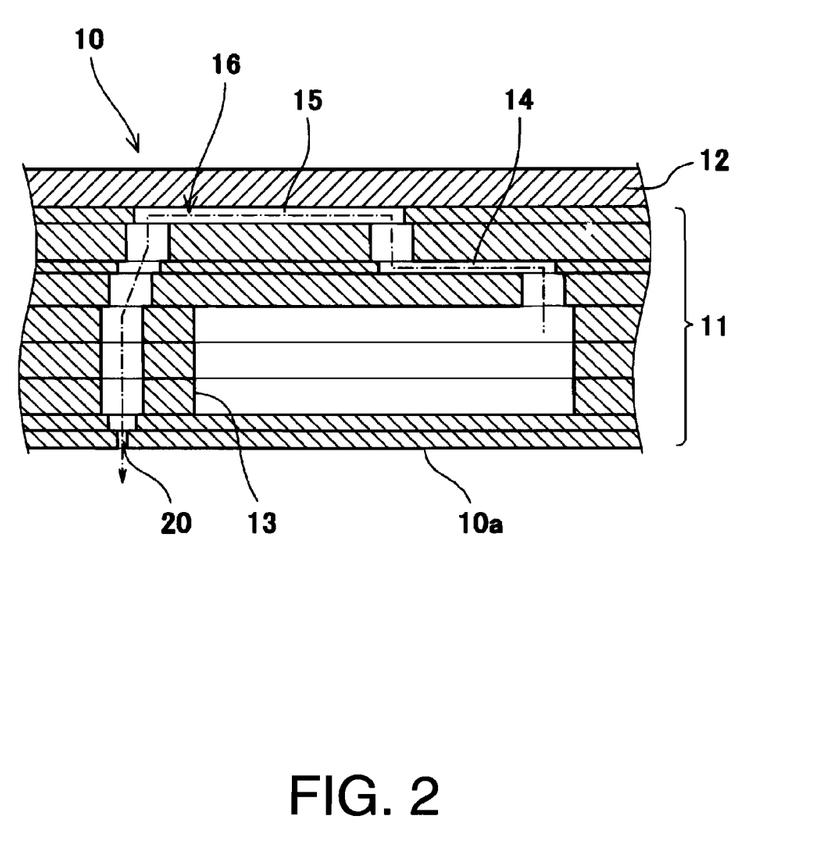
FIG. 2 is a cross-sectional side view of a part of an inkjet head in the inkjet printer according to the first embodiment of the present invention.

As shown in FIG. 2, the head 10 of the inkjet head 3 includes a fluid channel unit 11 in a lower section and an actuator unit 12 attached on top of the fluid channel unit 11. The fluid channel unit 11 includes a plurality of laminated metal plates, and a downward surface of a lowermost metal plate in the fluid channel unit 11 is formed to serve as the nozzle surface 10a. In the fluid channel unit 11, manifold channels 13, which are in fluid communication with an ink source (not shown), apertures 14, and ink paths 16 with pressure chambers 15 are formed, although solely one of each is shown in FIG. 2. The ink paths 16 are formed in one-to-one correspondence with the nozzles 20, and each of the ink paths 16 connects the corresponding nozzle 20 to one of the manifold channels 13. The actuator unit 12 is equipped with a plurality of actuators (not shown), each of which can be independently activated and inactivated. The actuators are arranged in one-to-one correspondence with the pressure chambers 15 and therefore with the nozzles 20. The actuators may be, for example, piezoelectric or bimorph-typed actuators. Other than those, for example, the actuators may be thermally deformable actuators or any other actuators, which can apply liquid-discharging force to the ink.

Figure 3:
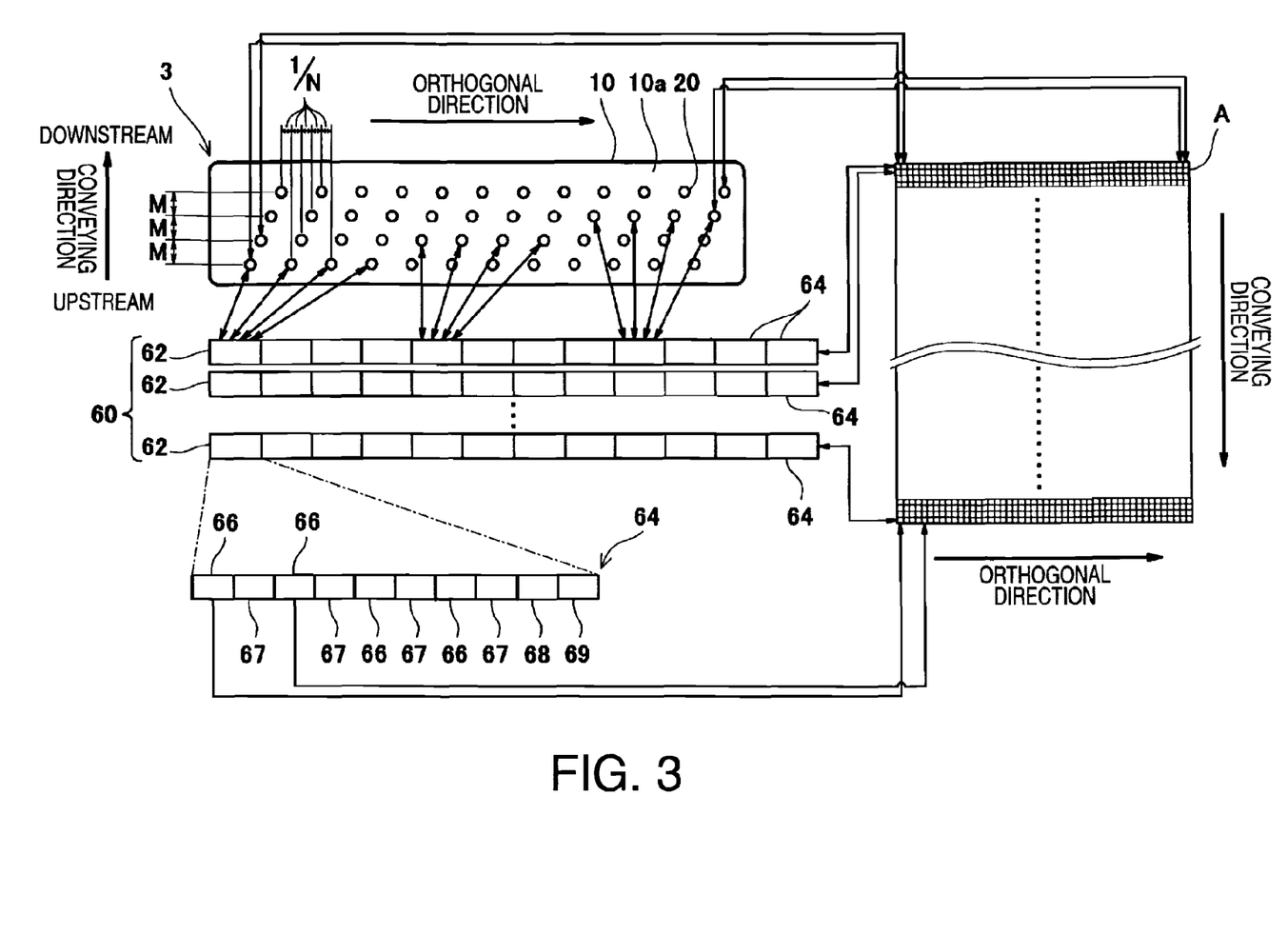
FIG. 3 is a diagram to illustrate relationships amongst nozzles in a nozzle surface of the inkjet head, a data structure of print data, and positions of pixel areas on a recording medium in the inkjet printer according to the first embodiment of the present invention.

The plurality of nozzles 20 are formed and arranged to correspond to pixel areas A (see FIG. 3), which are arranged to align in a row along the orthogonal direction Y. In FIG. 3, the correspondence between some of the nozzles 20 and some of the pixel areas A is indicated by arrows. A quantity of the nozzles 20 is equivalent to a quantity of the pixel areas A in the row aligned along the orthogonal direction Y, whilst the quantity of the pixel areas in the row can be determined by a maximum allowable width of the sheet P in the inkjet printer 1. In FIG. 3, the arrangement and quantity of the nozzles 20 are simplified and reduced for illustration; however, it is to be noted that the quantities of the nozzles and the pixel areas are greater in practical use, and the nozzles and the pixel areas can be in more dense arrangement than the illustration.

In the nozzle surface 10a, the nozzles 20 are arranged in different X-coordinate positions from one another, at least within a part (i.e., within a group of four nozzles 20), with reference to the conveying direction X. If the nozzles 20 were arranged in a single row in a same X-coordinate position with reference to the conveying direction X whilst Y-coordinate positions with reference to the orthogonal direction Y are maintained, the nozzles 20 in the row would be arranged to be evenly spaced apart from one another along the orthogonal direction Y. In this regard, the space between the nozzles 20 is equivalent to an inverse number of the resolution of the pixel areas A along the orthogonal direction Y (i.e., 1/N).

In the present embodiment, the nozzles 20 are arranged in four (4) rows, which lie in parallel with the orthogonal direction Y. The rows of nozzles 20 are laid out to extend perpendicularly to the conveying direction X to be evenly spaced apart from one another. A distance M between two adjoining nozzle rows is greater than a size of a pixel area A along the conveying direction X (i.e., an inverse number of the resolution of the pixel areas A along the conveying direction X). In the following description, amongst the rows of nozzles 20, the nozzle row at a most upstream side with reference to the conveying direction X may be referred to as a first nozzle row. Further, the nozzle row at a second, third, and fourth from the upstream may be referred to as a second, third, and fourth nozzle row respectively. When a line of image is formed, ink droplets are discharged from the nozzles 20 in the first, second, third, and fourth nozzle rows sequentially in the order described. Therefore, when the fourth discharge from the nozzles 20 in the fourth nozzle row is finished, the line of image is completed.

Behaviors of the conveyer system 2 and the inkjet head 3 controlled by a controller device 4 (see FIG. 4) will be described below. Whilst the controller device 4 manipulates the conveyer system 2 to carry the sheet P in the position below the nozzle surface 10a, the inkjet head 3 is driven to discharge droplets of ink downwardly. The discharged ink droplets adhere to form dots in the pixel areas A defined on the recordable surface of the sheet P to form the image. In this regard, the dots are formed in the pixel areas A in upper-stream X-positions with reference to the conveying direction X earlier, and in the pixel areas A in lower-stream X-positions with reference to the conveying direction X, the dots are formed later. In the inkjet printer 1 according to the present embodiment, the nozzles 20 are arranged, at least within the smaller group, in the different X-positions (i.e., in different nozzle rows) from one another with reference to the conveying direction X; therefore, even when all of the nozzles 20 in the nozzle surface 10a discharge ink droplets at the same time, the ink droplets do not fall on the pixel areas A arranged in the same X-positions simultaneously.

Figure 4:
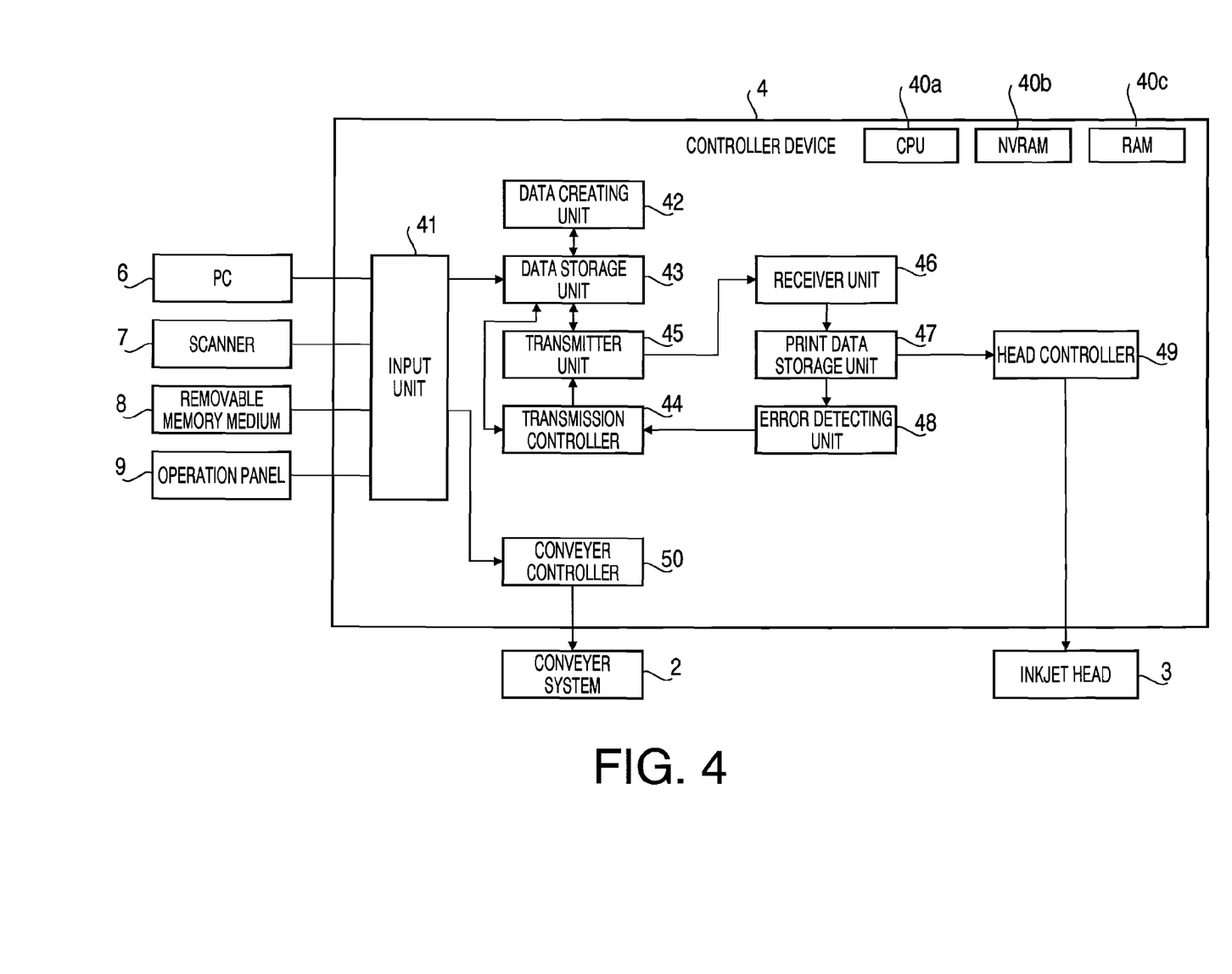
FIG. 4 is a block diagram to illustrate a configuration of a controller device in the inkjet printer according to the first embodiment of the present invention.

The controller device 4 includes a central processing unit (CPU) 40a, a non-volatile random access memory (NVRAM) 40b, and a random access memory (RAM) 40c, which are connected with one another and with each of components in the controller device 4 described below (conductive lines to indicate the connection are omitted in FIG. 4). The CPU 40a executes arithmetic operations, and the NVRAM 40b is a non-volatile rewritable memory to store controlling programs and instructions to be executed by the CPU 40a and data to be used in the controlling programs. The controlling programs may originally be stored in a memory medium (e.g., magnetic storage medium, CD-ROM, and memory card) and installed in the NVRAM 40b. Alternatively, the controlling programs stored in a memory medium may be directly activated in the controller device 4 without being installed in the NVRAM 40b. The RAM 40c temporarily stores data to be used in the controlling programs when the programs are active. Thus, the components in the controller device 40, including the hardware and the software programs stored in the NVRAM 40b, work in cooperation with one another to achieve functionality of the inkjet printer 1.

The controller device 4 further includes an input unit 41, a data creating unit 42, a data storage unit 43, a transmission controller 44, a transmission unit 45, a receiver unit 46, a print data storage unit 47, an error detecting unit 48, a head controller 49, and a conveyer controller 50.

The input unit 41 is connected with an external personal computer (PC) 6, a scanner 7 included in the inkjet printer 1, a removable memory medium 8, which is removably attached to the inkjet printer 1, and an operation panel 9 of the inkjet printer 1. Image data, which represents the image to be formed by the inkjet printer 1, is inputted in the controller device 4 via the input unit 41. When the image data is inputted, a user's instruction to print the image is entered via the PC 6 or the operation panel 9. The image data inputted in the controller device 4 may be stored in the data storage unit 43. The image data may be, for example, in a known color format such as CMYK-format or RGB-format.

The data creating unit 42 creates print data, by which the inkjet head 3 is driven to form the image, based on the image data inputted in the controller device 4. For example, the data creating unit 42 may modify inputted 256-scaled image data and create multiple-valued dot data by processing the image data in random dithering. The created print data may represent a value of each pixel area A in scale of four, which indicates a size of a dot to be applied to the pixel area A (hereinafter, a "four-scaled value"). The size of the dot to be applied to the pixel area A may include zero (no dot), a small dot, a medium-sized dot, and a large dot.

Print data 60 (see FIG. 3) created in the data creating unit 42 is transmitted from the transmitter unit 45 to the receiver unit 46. In so doing, the print data 60 is divided into a plurality of pieces of line data 62, each of which represents a row of pixel areas A arranged in line on the recordable surface of the sheet P along the orthogonal direction Y. A quantity of pieces of line data 62 is equivalent to a quantity of pixel areas A arranged in a column along the conveying direction X.

Each piece of line data 62 includes a plurality of pieces of frame data 64. A piece of frame data 64 includes information concerning some of the pixel areas A arranged along the orthogonal direction Y in a row. More specifically, the frame data 64 includes a plurality of pixel identifications 66, each of which identifies one of the some pixel areas A, and a plurality of four-scaled values 67, each of which is associated with the one of the pixel identifications 66, and an error identification 68, which is used to detect a transmission error in the frame data 64.

The some of the pixel areas A, of which information is included in the same piece of frame data 64, are pixel areas A to be formed in the ink discharged from the nozzles 20 aligned in a same nozzle row in same X-positions with reference to the conveying direction X in the nozzle surface 10a. Therefore, the pixel areas A identified by the pixel identifications 66 in the same frame data 64 are arranged in the same X-positions with reference to the conveying direction X. The data creating unit 42 may modify arrangement of the data when creating the frame data 64 as described above. Further, the data creating unit 42 may include positional codes 69 to identify positions of the nozzles 20, which discharge the ink to form dots in the some pixel areas A, in the nozzle surface 10a with reference to the conveying direction X. Thus, by referring to the positional codes 69, the frame data 64 to be retransmitted may be easily extracted. Retransmission of the frame data 64 will be described later in detail.

Referring back to FIG. 4, the transmitter unit 45 transmits the print data 60 created in the data creating unit 42 to the receiver unit 46. The transmitter unit 45 and the receiver unit 46 are connected with each other via a predetermined communication interface, and when the print data 60 is transmitted from the transmitter unit 45 to the receiver unit 46, transmission failure such as data loss and an error may occur during the communication. The receiver unit 46 is provided in the inkjet head 3 and is electrically connected with the inkjet head 3 without any communication interface intervening in there-between. In this regard, the receiver unit 46 may not necessarily be arranged inside a housing (not shown) of the inkjet head 3 but may be arranged outside the housing or in a separated position from the inkjet head 3 as long as the receiver unit 46 can communicate with the inkjet head 3 without any intervening communication interface.

The transmission controller 44 controls the transmission of print data 60 from the transmitter unit 45 to the receiver unit 46. In particular, the transmission controller 44 manipulates the transmitter unit 45 to transmit the divided print data 60 (i.e., the line data 62) piece-by-piece at a predetermined transmission cycle T (see FIG. 5). In so doing, the transmission controller 44 manipulates the transmitter unit 45 to transmit a piece of line data 62, which is for forming pixel areas A in a lower-stream side with reference to the conveying direction X, earlier than a line data 62 for pixel areas A to be formed in an upper-stream side. Further, the transmission controller 44 manipulates the transmitter unit 45 to transmit the plurality of pieces of frame data 64 in the line data 62 piece-by-piece.

The receiver unit 46 receives the print data 60 from the transmitter unit 45. The received print data 60 is stored in the print data storage unit 47. When the frame data 64 is received, the error detecting unit 48 refers to the error identification 68 in the frame data 64 to detect a transmission error on basis of a piece of frame data 64. A method to detect a transmission error by the error detecting unit 48 may not necessarily be limited. For example, transmission failure may be detected with reference to the error identification 68 or by a known error detecting method such as parity check.

When transmission failure is detected in the frame data 64 by the error detecting unit 48, the transmission controller 44 manipulates the transmitter unit 45 to hold or resend the failed frame data 64. In so doing, the frame data 64 is retransmitted within a predetermined length of retransmission period T2 (see FIG. 5), which is between completion of receipt of a piece of line data 62 at the receiver unit 46 and start of transmission of a next piece of line data 62 at the transmitter unit 45.

The head controller 49 manipulates the inkjet head 3 to discharge a predetermined amount of ink in droplets or not discharge any ink onto the pixel areas A based on the four-scaled data 67 in the print data 60, which is stored in the print data storage unit 47. The conveyer controller 50 manipulates the conveyer system 2 to convey the sheet P in a predetermined conveying speed in order to have the ink droplets on the corresponding pixel areas A.

Figure 5:
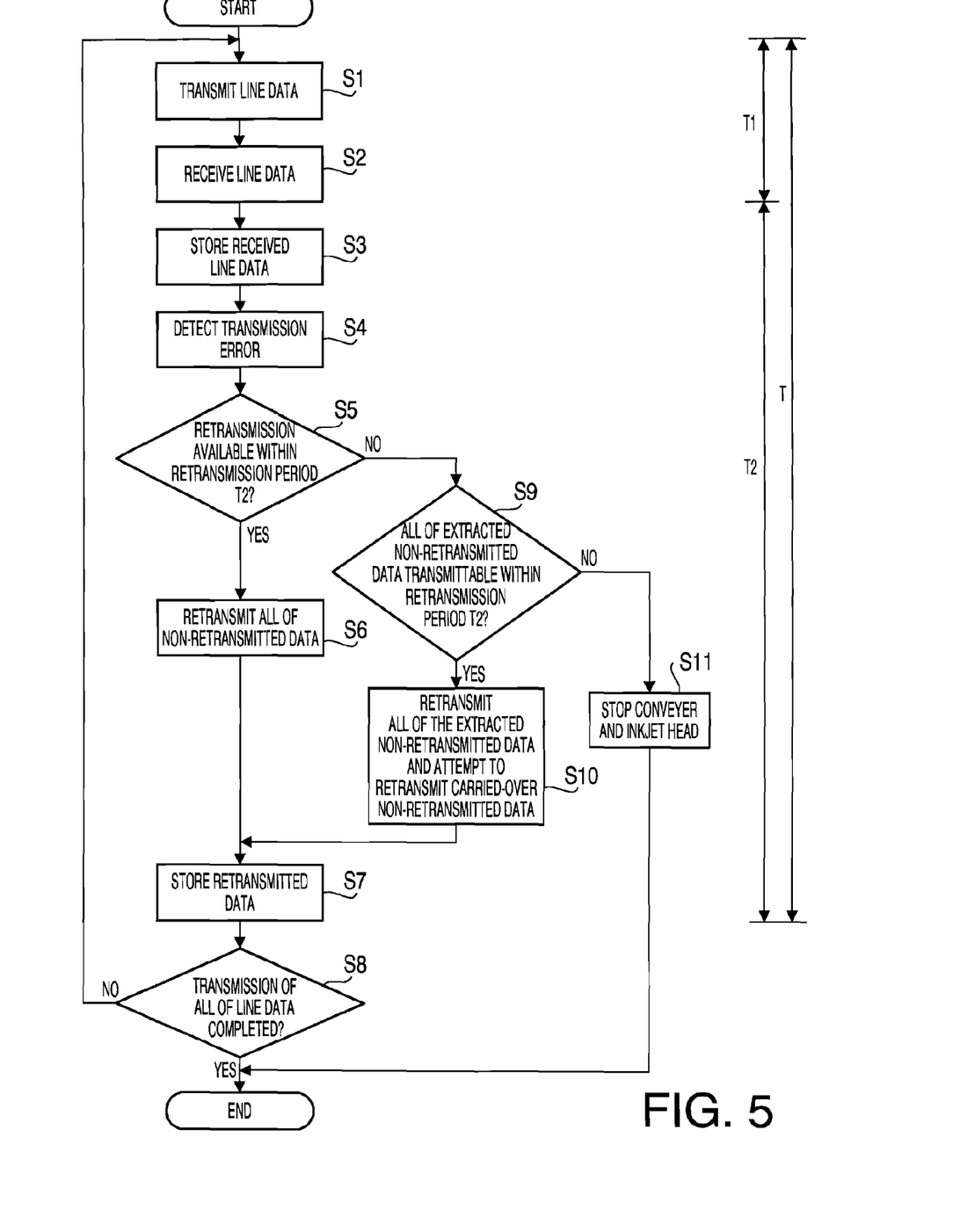
FIG. 5 is a flowchart to illustrate a flow of retransmission in the inkjet printer 1 according to the first embodiment of the present invention.

Transmission of the print data 60 will be described with reference to FIG. 5. In S1, the transmitter unit 45 starts transmitting a piece of line data 62. In S2, the receiver unit 62 completes receiving of the line data 62. In S3, the received line data 62 is stored in the print data storage unit 47. In the following description, a time period between start of transmission of the line data 62 at the transmitter unit 45 and completion of receiving the line data 62 at the receive unit 46 will be referred to as "required transmission period T1."

In S4, the error detecting unit 48 examines the frame data 62 for an error. When an error is detected, in S5, the transmission controller 44 judges as to whether all the pieces of frame data 62, in which errors were detected in past transmissions, and which have not been retransmitted, are transmittable within a retransmission period T2. The frame data 62, in which the errors were detected, and which have not yet been retransmitted, will be referred to as non-retransmitted data. The retransmission period T2 is equivalent to a difference obtained by subtracting the required transmission period T1 from a length of the transmission cycle T. In S5, therefore, the transmission controller 44 judges as to whether a substantial length of time to retransmit all the pieces of non-retransmitted data remains.

In S5, if the non-retransmitted data is transmittable within the retransmission period T2 (S5: YES), in S6, the transmission controller 44 manipulates the transmitter unit 45 to retransmit all the pieces of non-transmitted data to the receiver unit 46. In S7, the receiver unit 46 stores the received data being the frame data 64 in the print data storage unit 47. In S8, the transmission controller 44 determines as to whether all the pieces of line data 62 in the print data 60 have been transmitted to the receiver unit 46. If one or more pieces of line data 62 remains unsent (S8: YES), the flow returns to S1, the transmitter unit 45 starts transmitting a next piece of line data 62. If no more piece of line data 62 remains (S8: NO), transmission of the print data 60 is finished.

According to the present embodiment, in order to reduce a quantity of the pieces of line data 62 to be stored in the print data storage unit 47, when a piece of line data 62 is received, the inkjet head 3 is controlled to discharge the ink from the nozzles 20, which are arranged in the nozzle surface 10a in the most upstream X-position with reference to the conveying direction X (i.e., the first nozzle row in FIG. 3), to consume the line data 62 within a shorter time period. Thus, the transmission controller 44, the head controller 49, and the conveyer controller 50 manipulates the transmitter unit 45, and the inkjet head 3, and the conveyer system 2 respectively in cooperation with one another to discharge the ink. Therefore, based on the cooperation, for example, when a print instruction is entered, transmitter unit 45 creates the print data 60, and the conveyer system 2 conveys the sheet P simultaneously. Further, a first piece of line data 62 is transmitted at a specific timing in order for the receiver unit 46 to receive the line data 62 immediately before the pixel areas A at the most downstream position reach the position below the inkjet head 3.

In S5, if the non-retransmitted data is not transmittable within the retransmission period T2 (S5: NO), in S9, the transmission controller extracts non-retransmitted data to be preferentially retransmitted to the receiver unit 46 from the line data 62 and examines as to whether all the extracted pieces of non-retransmitted data are transmittable within the retransmission period T2.

A method to determine priority of the data to be retransmitted will be described below. Firstly, a conveying speed V (inch/sec.) of the sheet P is determined. The conveying speed V is obtained by dividing a length of a pixel area A along the conveying direction X (i.e., an inverse number of the resolution N (dpi) of the pixel areas A along the conveying direction X) by the transmission period T (sec.) for a piece of line data 62 (V=1/N*1/T). Secondly, it is to be noted that the distance M (inch) between the two adjoining nozzle rows is greater than the inverse number of the resolution N of the pixel area A (i.e., the length of the pixel area A) along the conveying direction (i.e., M>1/N). Further, within the row of pixel areas A aligned in line along the orthogonal direction Y, when ink droplets are discharged onto two adjoining pixel areas A, time difference G (sec.) between a time point, at which an ink droplet is discharged onto one of the pixel areas A from one of the nozzles 20 in one of the nozzle rows (e.g., the first nozzle row), and a time point, at which an ink droplet is discharged onto the other of the two pixel areas A from one of the nozzles 20 in an adjoining nozzle row (e.g., the second nozzle row), is obtained by the distance M divided by the conveying speed V (G=M/V=M*N*T), i.e., by multiplying the transmission cycle T by the resolution N and by the distance M. Therefore, when the ink droplets were to be discharged from the first nozzle row immediately after completion of receiving an entire piece of line data 62, the ink droplets would be discharged from the second nozzle row at least after a time period, which is required for transmitting the line data 62 for M*N times, had passed. (In the following description, a sign "K" will represent the multiplication "M*N.") Further, from the third nozzle row, the ink droplets would be discharged at least after a time period, which is required for transmitting the line data 62 for 2*K times, had passed.

In this regard, the transmission controller 44 extracts the frame data 64 representing the pixel areas A to be formed in the ink discharged from the nozzles 20 in the first nozzle row amongst the other frame data 64 included in the same line data 62 having been transmitted to the receiver unit 46 most recently. Meanwhile, the frame data 64 representing the pixel areas A to be formed in the ink discharged from the nozzles 20 in the second nozzle row may be retransmitted within a period, in which pieces of line data 62 are transmitted for K times. Therefore, if a transmission error is detected in the frame data 64 representing the pixel areas A to be formed by the nozzles 20 in the second nozzle row, the frame data 64 is allowed to be retransmitted at least in the chances of K times before the inkjet head 3 is urged to be supplied with the frame data 64 for discharging the ink droplets onto the corresponding pixel areas A. According the present embodiment, when the resolution N is 600 dpi, and the distance M is 0.1 inch, a quantity K of the chances is 60. In the present example, therefore, 60 times of chances are reserved for retransmission of the frame data 64 for the pixels A corresponding to the second nozzle row.

Even with the chances of retransmission as many as K times, although it is highly unlikely to occur in consideration of probability of transmission errors, if the frame data 64 was a part of the line data 62, which was transmitted in the transmission of K-times before, that is, if the frame data 64 failed in all of the retransmission chances of K times, ink droplets will not be discharged unless the frame data 64 is retransmitted immediately. In this regard, retransmission of the frame data 64 cannot be carried over further to a next retransmission chance. Thus, the transmission controller 44 extracts the frame data 62 having been failed in retransmission for K times is the data to be preferentially retransmitted. Further, priority of the frame data 64 for the pixel areas A to be formed by the nozzles 20 in the third and fourth nozzle rows, in addition to the second nozzle row, is similarly determined in consideration of the distances M*2 and M*3 from the first nozzle row respectively.

According to the present embodiment, thus, retransmission of non-retransmitted data, which is required to be received in the receiver unit 46 in shorter time, is attempted preferentially. Between two pieces of frame data 64 included in same line data 60, that is, between two pieces of frame data 64 representing the pixel areas A aligned in same X-positions with reference to the conveying direction X, the frame data 64 representing the pixel areas A to be formed by the nozzles 20 in a nozzle row in an upper-stream position along the conveying direction X is retransmitted earlier. Meanwhile, between two pieces of frame data 64 representing the pixel areas A to be formed by a same nozzle 20, the frame data 64 included in the line data having been transmitted earlier, that is, the frame data 64 representing the pixel area A in a lower-stream position along the conveying direction X, is retransmitted earlier. Based on these two criteria, the priority of frame data 64 to be retransmitted is determined.

Referring back to FIG. 5, in S9, if the transmission controller determines that all the pieces of extracted non-retransmitted data are transmittable within the retransmission period T2 (S9: YES), in S10, the transmission controller 44 retransmits all the pieces of extracted non-retransmitted data to the receiver unit 46. Further, the transmission controller 44 manipulates the transmitter unit 45 to transmit the non-retransmitted data, which are left unsent from preceding retransmission chances. In so doing, the transmission controller 44 attempts to retransmit the carried-over non-retransmitted data as many pieces as possible within the retransmission period T2. The again carried-over non-transmitted data, which is still not transmitted within the retransmission period T2, is left to be retransmitted in a next chance. In S7, the retransmitted data is stored in the print data storage unit 47. The flow proceeds to S8. If one or more pieces of line data 62 remains unsent (S8: YES), the flow returns to S1, the transmitter unit 45 starts transmitting a next piece of line data 62. If no more piece of line data 62 remains (S8: NO), transmission of the print data 60 is finished.

In S9, if the transmission controller 44 determines that not all the pieces of extracted non-retransmitted data are transmittable within the retransmission period T2 (S9: NO), in S11, the head controller 49 manipulates the inkjet head 3 to stop. Further, the conveyer controller 50 manipulates the conveyer system 2 to stop. Thus, printing is suspended.

According to the above-described flow, when an error occurs during transmission of the frame data 64, the frame data 64 for the pixel areas A, which are to be formed by the nozzles 20 arranged in the upper-stream X positions with reference to the conveying direction X, is retransmitted preferentially. Meanwhile, the frame data 64 for the pixel areas A, which may not necessarily be retransmitted immediately but may be carried over, may be retransmitted in later chances. In this regard, the retransmission period T2 may be shorter than a time period, in which an entire piece of line data 62 can be retransmitted. Therefore, the retransmission period T2 may be as short as a period, in which the line data 62 can be partially retransmitted. Thus, the transmission cycle T can be shortened, and the conveying speed V of the sheet P can be higher. In other word, the inkjet printer 1 with improved printing speed can be provided.

More specifically, the retransmission period T2 may be as short as a period, in which the print data 60 for the pixel areas A to be formed by the nozzles 20 arranged in the most upstream X-positions with reference to the conveying direction X is retransmitted. In the present example, in which each of the plurality of (e.g., four) nozzle rows includes a same quantity of nozzles 20 (see FIG. 3), the retransmission period T2 may be shortened for a period, which is obtained by multiplication of the inverse number of a quantity (e.g., 4) of the nozzle rows. Thus, the transmission cycle T can be sustained to be shortest, whilst retransmission of all the pieces of frame data 64 for the pixel areas to be formed by the nozzles 20 in the first nozzle row can be completed within the retransmission period T2, even if errors occur in each piece of the frame data 64. It is to be noted that the retransmission period T2 can be set to be even shorter in consideration of probability of error occurrence in data transmission.

According to the above-described flow, if the non-retransmitted data to be retransmitted preferentially is not transmittable within the retransmission period T2, printing is suspended; therefore, an incomplete image can be prevented from being printed.

In the above-described flow, the length of the retransmission period T2 is assumed to be consistent. However, the retransmission period T2 may be variable. For example, two different lengths of retransmission period T2 may be alternately reserved.

Further, data transmission of a next piece of line data 62 after completion of retransmitting the non-retransmitted data may not necessarily wait until the retransmission period T2 elapses but may be resumed as soon as retransmission of the non-retransmitted data is completed, even before the retransmission period T2 elapses, and remaining of the retransmission period T2 may be omitted. In so doing, a length of the omitted period may be reserved, and in a next and succeeding data transmission, if not all the non-retransmitted data is transmittable within the retransmission period T2, the reserved length of the omitted period may be partially or entirely added to the retransmission period T2 in order to retransmit the non-retransmitted data within the extended retransmission period T2. Thus, when a quantity of the non-retransmitted data is smaller, transmission of the next piece of line data 62 may be resumed earlier. Meanwhile, when a quantity of the non-retransmitted data is greater, transmission of the next piece of line data 62 may be delayed within a range corresponding to the omitted length of the retransmission period T2 in the past retransmission.

In the above-described embodiment, the frame data 64 representing the pixel areas A to be formed by the nozzles 20, which are arranged in the most upstream X-positions with reference to the conveying direction X, preferentially. However, the frame data 64 for the pixel areas A to be formed by the nozzles 20, which are arranged in vicinities of the most upstream X-positions with reference to the conveying direction X, may be transmitted preferentially, in addition to the nozzles 20 arranged in the most upstream positions, over the frame data 64 for the pixel areas A to be formed by the nozzles 20 arranged in a lower-stream X-positions.

Second Embodiment

Figure 6:
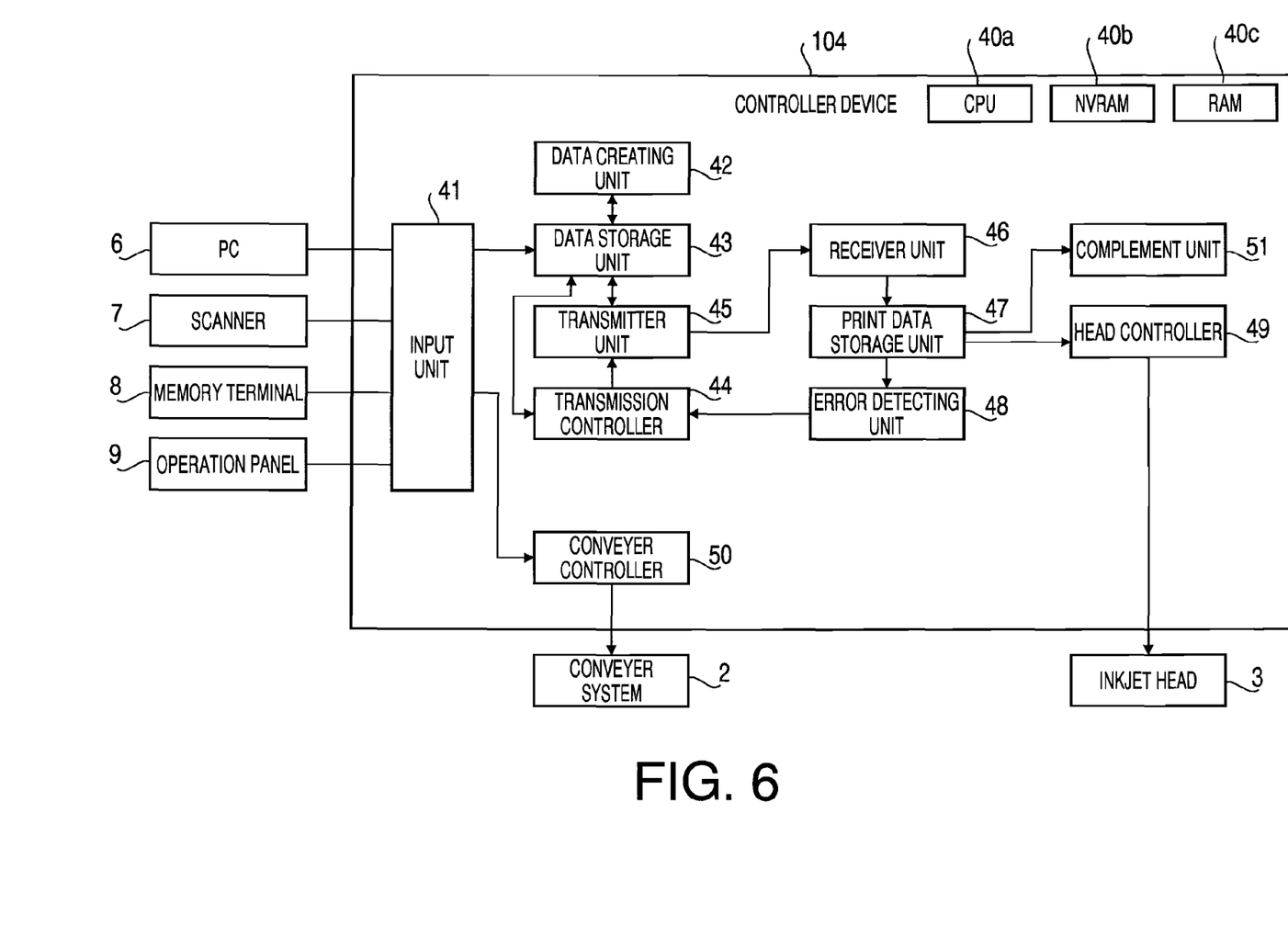
FIG. 6 is a block diagram to illustrate a configuration of a controller device in the inkjet printer according to a second embodiment of the present invention.
Figure 7:
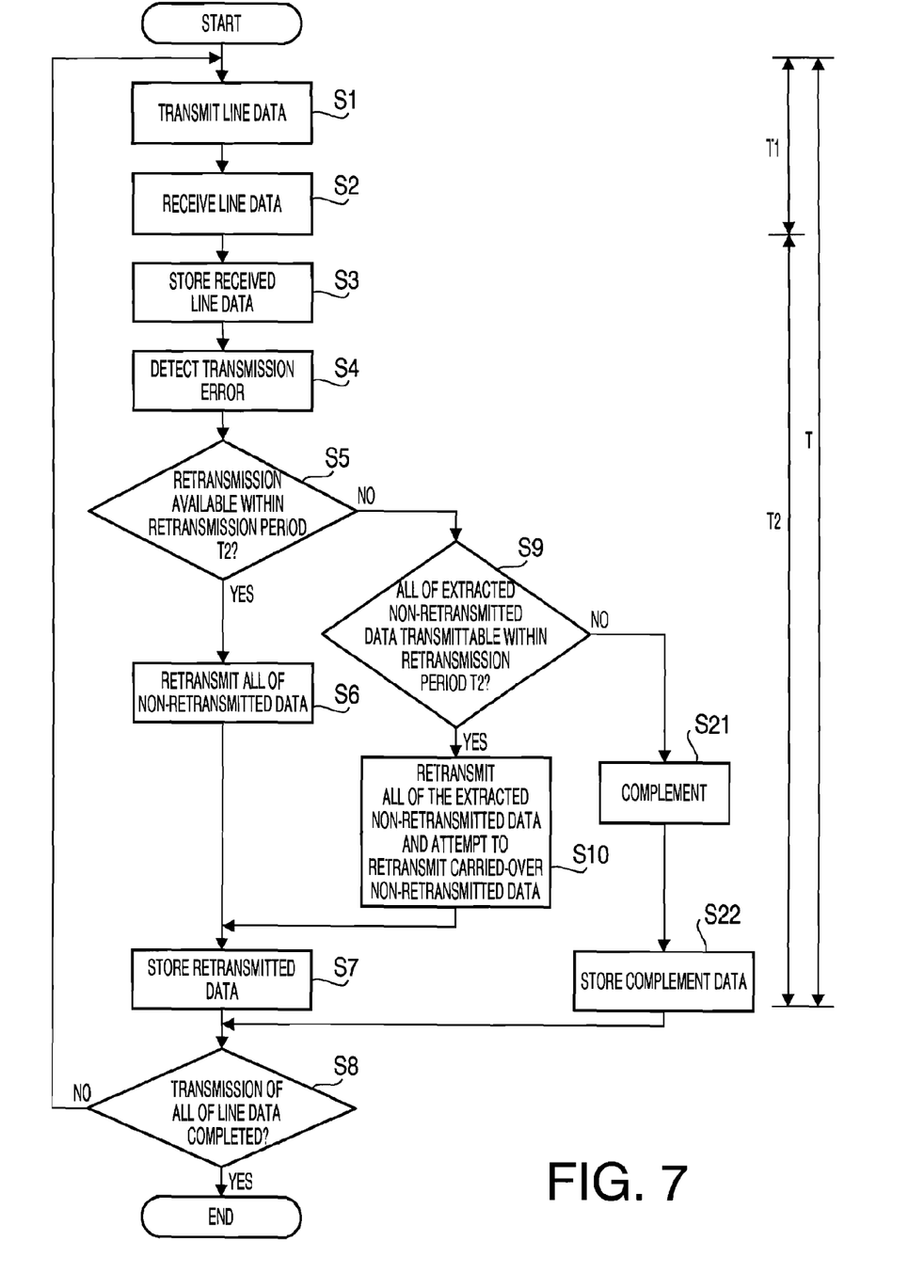
FIG. 7 is a flowchart to illustrate a flow of retransmission and complementation in the inkjet printer 1 according to the second embodiment of the present invention.
Figure 8:
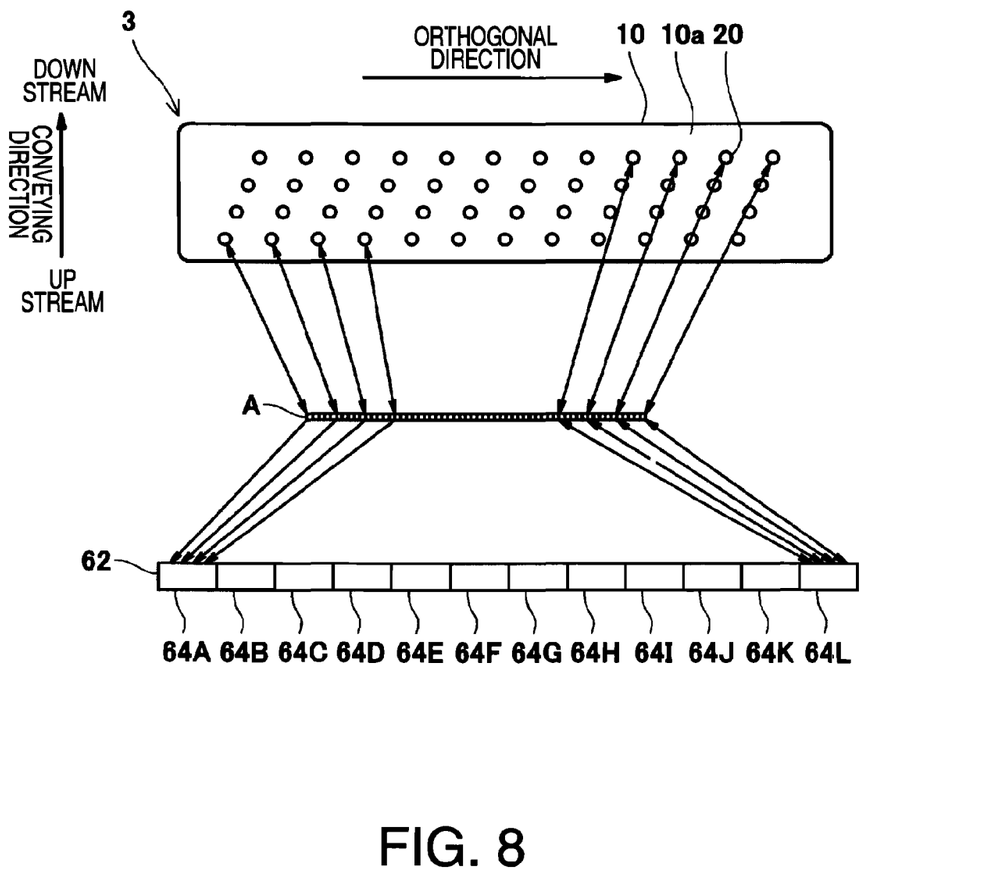
FIG. 8 is a diagram to illustrate relationships amongst nozzles in a nozzle surface of the inkjet head, a data structure of print data, and positions of pixel areas on a recording medium in the inkjet printer according to the second embodiment of the present invention.

A second embodiment of the present invention will be described with reference to FIGS. 6-8. A controller device 104 according to the second embodiment is configured similarly to the controller device 4 in the first embodiment but is different from the controller device 4 in having a complement unit 51. In the first embodiment, when the transmission controller 44 determines that not all the pieces of extracted non-retransmitted data are transmittable within the retransmission period T2, printing is suspended (see S9 and S11 in FIG. 5). Meanwhile, in the second embodiment, when the transmission controller 44 determines that not all the pieces of extracted non-retransmitted data are transmittable within the retransmission period T2 (S9: NO), in S21 (see FIG. 7), the non-retransmitted data, which is to be preferentially transmitted, is transmitted as much as possible within the retransmission period T2. Further, the four-scaled value 67 representing the pixel area A described in the carried-over non-retransmitted data, which was not transmitted before the retransmission period T2 elapses, is complemented based on the four-scaled value 67 for two neighboring pixel areas A. In the complementation, the four-scaled values 67 of the two neighboring pixel areas A, each of which adjoins the pixel area A described in the failed frame data 64, are compared. If the two four-scaled values 67 are identical, a four-scaled value 67 for the erred pixel area A described in the failed frame data 64 is set to be the value identical to the four-scaled values 67 of the two neighboring pixel areas A. When the four-scaled values 67 of the two neighboring pixel areas A are different by one, a four-scale value 67 for the erred pixel area A is set to be identical to the four-scale value 67 of one of the two neighboring pixel areas A. When the four-scaled values 67 of the two neighboring pixel areas A are different by two or more, a four-scale value 67 for the erred pixel area A is set to be an intermediate value between the two four-scaled values 67 of the two neighboring pixel areas A. Thus, the four-scaled value 67 for the erred pixel area A is complemented, and the complemented four-scaled value 67 is stored in the print data storage unit 47. The head controller 49 manipulates the inkjet head 3 to discharge a predetermined amount of ink or not discharge any ink onto the pixel areas A based on the complemented four-scaled data 67 in the print data 60, which is stored in the print data storage unit 47. Thus, even when the non-retransmitted data is not preferentially transmittable, the failed frame data 64 can be complemented. Therefore, the printing operation can be prevented from being suspended whilst the retransmission period T2 can be shortened.

A process for the complementation will be described with reference to FIG. 8. In FIG. 8, similarly to FIG. 3, quantities and arrangements of the nozzles 20 and the pixel areas A are reduced and simplified for illustration. In FIG. 8, twelve (12) pieces of first through twelfth frame data 64A-64L are illustrated. The first through third frame data 64A-64C describes the pixel areas A to be formed by the nozzles 20 in the first nozzle row, the fourth through sixth frame data 64D-64F describes the pixel areas A to be formed by the nozzles 20 in the second nozzle row, the seventh through ninth frame data 64G-64I describes the pixel areas A to be formed by the nozzles 20 in the third nozzle row, and the tenth through twelfth frame data 64J-64L describes the pixel areas A to be formed by the nozzles 20 in the fourth nozzle row. The first frame data 64A includes four-scaled values 67 for the pixel areas A, which are arranged in the first, fifth, ninth, and thirteenth positions from the left on the sheet P. The twelfth frame data 64L includes four-scaled values 67 for the pixel areas A, which are arranged in the 36th, 40th, 44th, and 48th positions from the left on the sheet P.

In the second embodiment, the retransmission period T2 is set to be as short as a length, in which two pieces of frame data 64 can be transmitted. Further, it is assumed that transmission errors are detected in the first, second, third, fifth, and sixth frame data 64A, 64B, 64C, 64E, and 64F, and no transmission error is detected in the remaining of the frame data 64D, 64G-64L. Furthermore, it is assumed that no non-retransmitted data to be retransmitted has been carried over. In this example, amongst three pieces of frame data 64 (the first through third frame data 64A-64C) to be preferentially transmitted for the first nozzle row, two pieces can be transmitted, and a four-scaled value for the one to be left unsent is complemented. Meanwhile, retransmission of the fifth and sixth frame data 64E, 64F for the third and fourth nozzle rows is carried over for a next or later retransmission chance. In this regard, at least one of the four pixel areas A described in the first frame data 64A is in a neighboring position along the orthogonal direction X with respect to one of the four pixel areas A described in the fourth frame data 64D and the four pixel areas A described in the tenth frame data 64J. Similarly, at least one of the four pixel areas A described in the second frame data 64B is in a neighboring position along the orthogonal direction X with respect to one of the four pixel areas A described in the fifth frame data 64E and the four pixel areas A described in the tenth frame data 64J. Further, at least one of the four pixel areas A described in the third frame data 64C is in a neighboring position along the orthogonal direction X with respect to one of the four pixel areas A described in the sixth frame data 64F and the four pixel areas A described in the eleventh frame data 64K. Meanwhile, the complement unit 51 complements the four-scaled values 67 for the pixel areas A described to the frame data, which is to be carried over, based on the four-scale values 67 of the neighboring pixel areas A.

In this regard, retransmission of the fifth and sixth frame data 64A, 64F is carried over until a next or later retransmission chance. In other words, the four-scaled values 67 for the neighboring pixel areas A, on which the complement four-scaled values 67 for the second and third frame data 64B, 64C are based, will not be available until the next or later retransmission chance comes. Therefore, the transmission controller 44 determines to retransmit the second and third frame data 64B, 64C and leave the first frame data 64A unsent. Accordingly, the complement unit 51 complements the four-scale value 67 for the pixel area A described in the first frame data 64A based on the four-scaled values 67 for the pixel areas A described in the fourth and tenth frame data 64D, 64J stored in the print data storage unit 47. Thus, the failed frame data can be complemented whilst the improved printing speed can be maintained, and the printing operation is continued without being suspended. When, however, the frame data 64 to be preferentially retransmitted is constrained to be carried over, and the complement unit 51 is incapable of complementing due to lack of the information concerning the neighboring pixel areas A, the printing operation may be suspended.

More Examples

Figure 9:
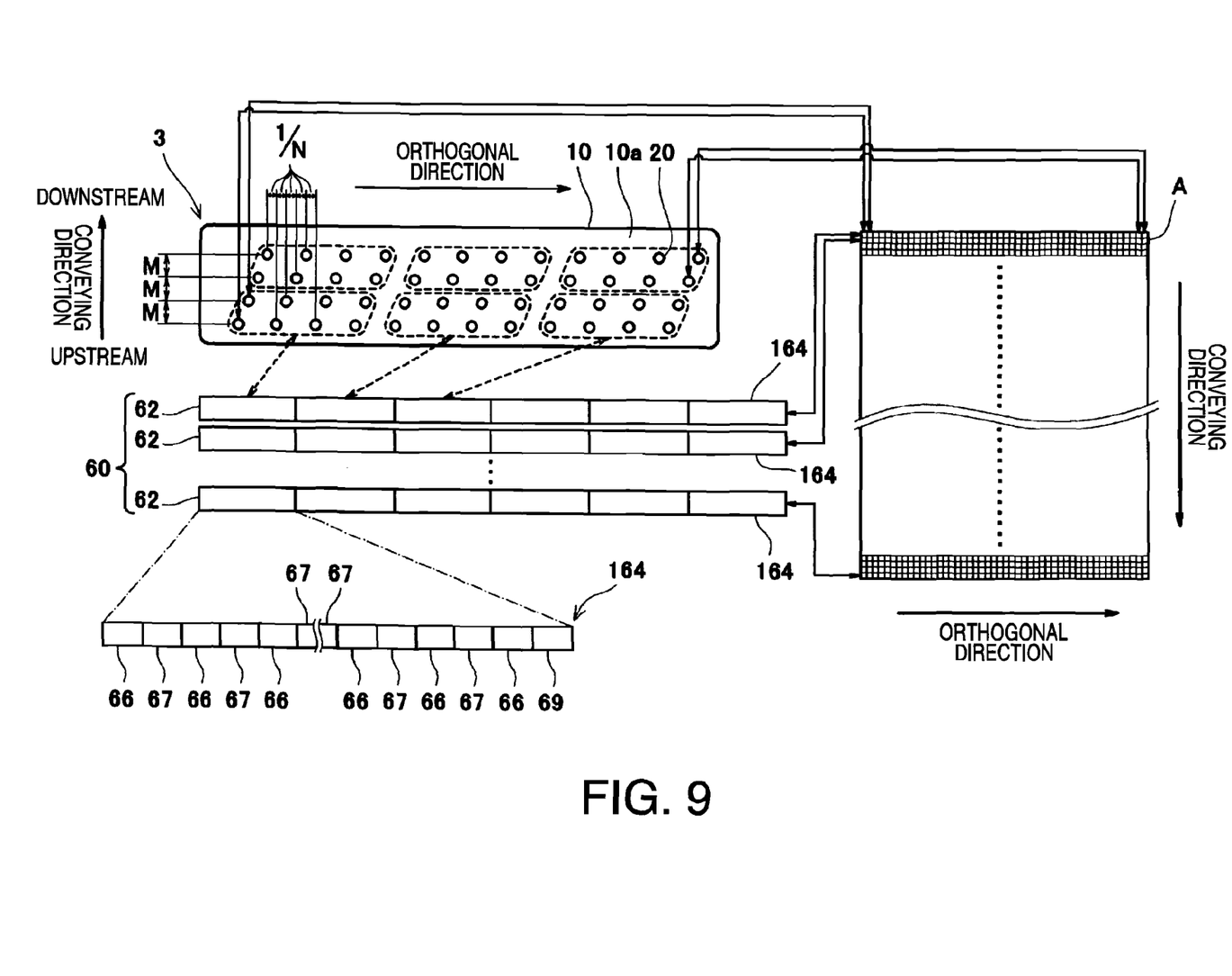
FIG. 9 is a diagram to illustrate relationships amongst nozzles in a nozzle surface of the inkjet head, a data structure of print data, and positions of pixel areas on a recording medium in the inkjet printer according to another example of the present invention.

A variation of the embodiments will be described with reference to FIG. 9. In the present example, print data 160 includes pieces of frame data 164, each of which indicates four-scaled values 67 of the pixel areas A to be formed by the nozzles 20 in the first and second nozzle rows, and pieces of frame data 164, each of which indicates four-scaled values 67 of the pixel areas A to be formed by the nozzles 20 in the third and fourth nozzle rows. Thus, the frame data 164 may not necessarily indicate four-scaled values 67 of the pixel areas A to be formed by the nozzles 20 in the nozzle row, which align along the orthogonal direction X.

For another example (not shown), the print data may not necessarily include a plurality of pieces of frame data, each of which describes a plurality of pixel areas A but may include a plurality of frame data, each of which describes a single pixel area A. In this configuration, each piece of frame data may include an error identification. In this regard, data rearrangement after dot data creation may not be required.

Figure 10:
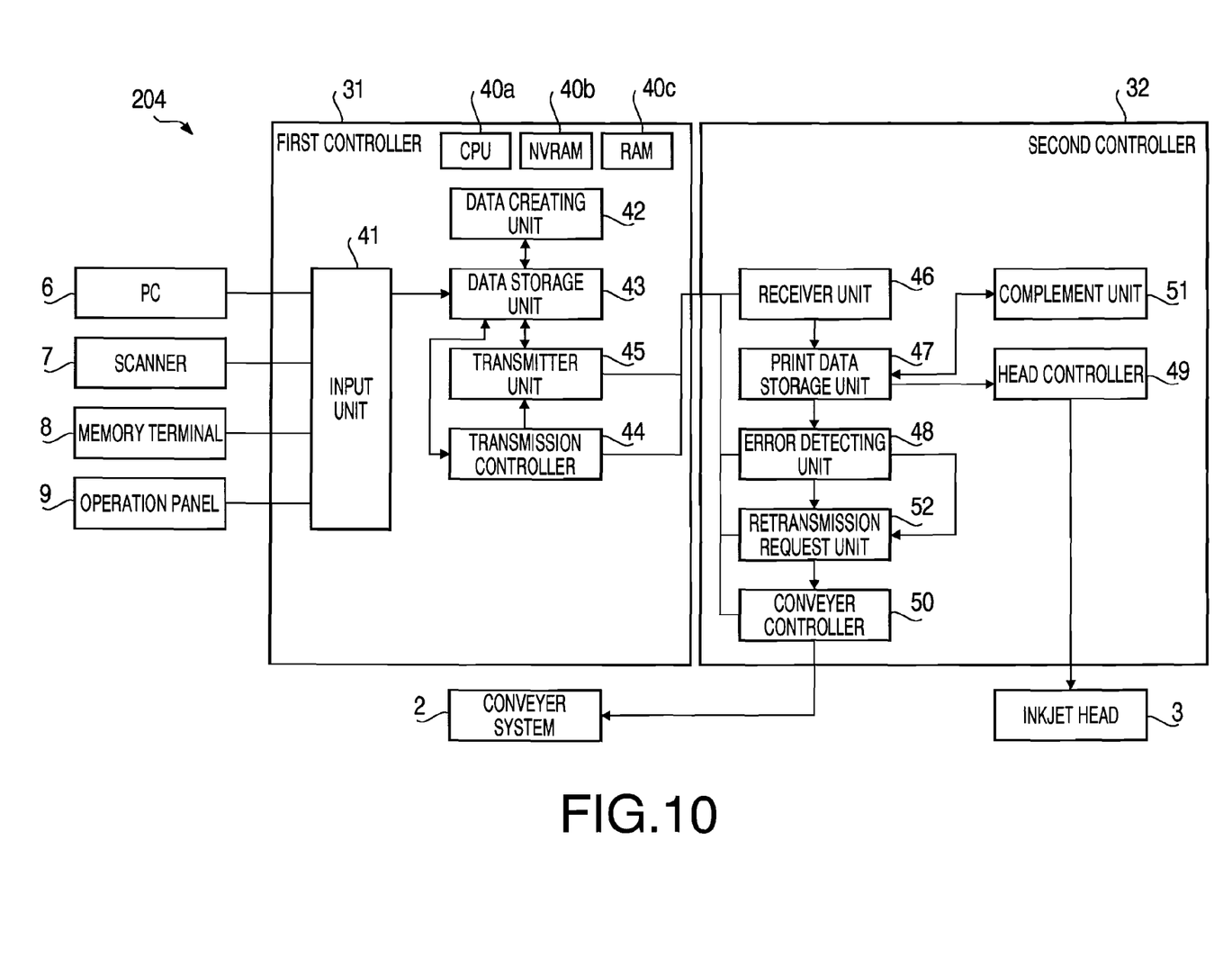
FIG. 10 is a block diagram to illustrate a configuration of a controller device in the inkjet printer according to another example of the present invention.

For another example, another variation of the embodiments will be described with reference to FIG. 10. A controller device 204 includes a first controller 31 and a second controller 32 with respective CPUs. The first controller 31 is equipped with an input unit 41, in which the image data from the external device (e.g., the PC 6) and the print instruction via the operation panel 9 are inputted. The first controller 31 is further equipped with the data creation unit 42, the data storage unit 43, the transmission controller 44, and the transmitter unit 45. Meanwhile, the second controller 32 is equipped with the head controller 49, the receiver unit 46, the print data storage unit 47, the error detection unit 48, the conveyer controller 50, and the complement unit 51. In the controller device 204, it is preferable that the second controller 32 having the receiver unit 46 and the error detection unit 47 is equipped with a retransmission request unit 52, which requests the transmission controller 44 to retransmit the failed frame data 64 when a transmission error is detected by the error detection unit 47.

Although examples of carrying out the invention have been described, those skilled in the art will appreciate that there are numerous variations and permutations of the image forming apparatus that fall within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

For example, a quantity of the inkjet head 3 in the inkjet printer 1 is not limited to one but may be two or more. For another example, the inkjet head 3 may be replaced with a liquid discharge head, which discharges, for example, a process agent to process a colorant.

What is claimed is:
1. An image forming apparatus to form an image on a recording medium, comprising:
   a conveyer system configured to convey the recording medium in a conveying direction:
   a liquid discharge head which has a plurality of nozzles configured to discharge the liquid onto a plurality of pixel areas to form dots according to line data, the plurality of pixel areas being defined on the recording medium to coincide with resolutions of the image to be formed along the conveying direction and a direction orthogonal to the conveying direction, the plurality of nozzles being arranged in rows, which are spaced apart from one another and laid out in parallel with the orthogonal direction, in different positions from one another with reference to the conveying direction at least within a part;
   a transmitter unit configured to transmit the line data for forming the dots in the plurality of pixel areas arranged in same coordinate positions on the recording medium with reference to the conveying direction to the liquid discharge head;
   a receiver unit provided in the liquid discharge head and configured to receive the line data from the transmitter unit;
   a line data storage unit configured to store the line data received by the receiver unit;
   an error detecting unit configured to detect a transmission error in the line data received by the receiver unit; and
   a controller configured
      to manipulate the transmitter unit to transmit the line data piece by piece to the receiver unit within a transmission cycle from start of transmission of a line data until start of a next line data, the transmission cycle including a predetermined period shorter than a period needed to transmit one line data to the receiver unit,
      to extract the part of the line data with the transmission error detected therein for forming the dots in the pixel areas in the liquid discharged from the nozzles arranged in one of the rows closer to an upstream position with reference to the conveying direction amongst the plurality of nozzles, and to manipulate the transmitter unit to transmit the extracted part of the line data with the transmission error to the receiver unit in the predetermined period; and wherein the controller manipulates the liquid discharge head and the conveying system to form the image in dots on the recording medium according to the line data stored in the line data storage unit and the part of the line data received by the receiver unit within the predetermined period.

2. The image forming apparatus according to claim 1, wherein remaining of the line data with the transmission errors, which is other than the line data with the transmission error detected therein and having been transmitted within the predetermined period, is attempted to be transmitted in a succeeding predetermined period, which is reserved in a succeeding transmission cycle, to be received by the receiver unit before the liquid discharge head is urged to be supplied with the remaining of the line data in order to discharge the liquid according to the remaining of the line data.

3. The image forming apparatus according to claim 2, wherein the controller stops forming the image on the recording medium when the remaining of the line data fails to be received by the receiver unit by the time the liquid discharge head is urged to be supplied with the remaining of the line data in order to discharge the liquid according to the remaining of the line data.

4. The image forming apparatus according to claim 1, further comprising:

a complement unit configured to complement remaining of the line data with the transmission errors, which is other than the line data with the transmission error detected therein and having been transmitted within the predetermined period, when the remaining of the line data fails to be transmitted within the predetermined period, wherein the complement unit complements the failed line data with reference to the line data for forming dots in neighboring pixel areas, which adjoin the pixel area for a dot to be formed according to the failed line data along the orthogonal direction.

5. The image forming apparatus according to claim 4, wherein the controller manipulates the transmitter unit to avoid carrying over the line data for forming the dots in the neighboring pixel areas to remain unsent when the transmitter unit transmits the line data with the transmission error detected therein and having been transmitted within the predetermined period.

6. The image forming apparatus according to claim 1, wherein the predetermined period ranges from completion of receipt of a line data for forming dots in a plurality of pixel areas arranged in the same coordinate positions with reference to the conveying direction to start of transmission of another line data for forming dots in a plurality of pixel areas arranged in the same coordinate positions with reference to the conveying direction.

7. The image forming apparatus according to claim 1, wherein the line data for forming the dots in the plurality of pixel areas arranged in same coordinate positions with reference to the conveying direction includes a plurality of pieces of frame data, each of which includes an identification for detecting the transmission error; and wherein the error detecting unit detects the transmission error in the frame data with the identification based on the included identification.

8. A non-transitory computer readable medium to store computer readable instructions to cause an image forming apparatus, which comprises a conveyer system to convey the recording medium in a conveying direction, a liquid discharge head with a plurality of nozzles arranged in rows extending along a direction orthogonal to the conveying direction, and a controller, to form an image on a recording medium by executing steps of:

transmitting line data for forming dots in a plurality of pixel areas arranged in same coordinate positions on the recording medium with reference to the conveying direction to the liquid discharge head piece by piece within a transmission cycle, which is from start of transmission of a line data until start of a next line data, the transmission cycle including a predetermined period shorter than a period needed to transmit one line data;

receiving the transmitted line data in a receiver unit provided in the liquid discharge head;

storing the received line data in a storage device;

examining the received line data to detect a transmission error;

extracting the part of the line data with the transmission error having been detected therein for forming the dots in the pixel areas in the liquid discharge from nozzles in one of the rows closer to an upstream position with reference to the conveying direction amongst the plurality of nozzles, transmitting the extracted part of the line data with the transmission error to the receiver unit in the predetermined period; and manipulating the liquid discharge head and the conveying system to form the image in dots on the recording medium according to the line data stored in the storage device and the line data received by the receiver unit within the predetermined period.

* * * * *